(12) United States Patent
Takada et al.

(10) Patent No.: US 7,795,815 B2
(45) Date of Patent: Sep. 14, 2010

(54) LIGHT SOURCE DEVICE AND PROJECTOR INCLUDING LIGHT SOURCE DEVICE

(75) Inventors: Yutaka Takada, Minami-Minowa-mura (JP); Shigekazu Takagi, Shimosuwa-machi (JP); Satoshi Fujii, Sanda (JP); Kesatoshi Takeuchi, Shiojiri (JP)

(73) Assignee: Seiko Epson Corporation (JP)

( * ) Notice: Subject to any disclaimer, the term of this patent is extended or adjusted under 35 U.S.C. 154(b) by 988 days.

(21) Appl. No.: 11/554,715

(22) Filed: Oct. 31, 2006

(65) Prior Publication Data
US 2007/0103649 A1 May 10, 2007

(30) Foreign Application Priority Data
Nov. 1, 2005 (JP) .............................. 2005-318028

(51) Int. Cl.
H01J 7/46 (2006.01)
H01J 19/80 (2006.01)
G03B 21/20 (2006.01)

(52) U.S. Cl. .......................................... 315/39; 353/85
(58) Field of Classification Search .................. 315/39, 315/34, 39.51, 39.53, 39.57, 248, 111.01, 315/111.21; 313/493; 353/85; 219/690
See application file for complete search history.

(56) References Cited

U.S. PATENT DOCUMENTS

| 4,504,718 | A | 3/1985 | Okatsuka et al. | |
|---|---|---|---|---|
| 2002/0011802 | A1* | 1/2002 | Espiau et al. | 315/246 |
| 2004/0046941 | A1* | 3/2004 | Yamamoto | 353/31 |

FOREIGN PATENT DOCUMENTS

| JP | 59-54191 | 3/1984 |
|---|---|---|
| JP | 60-123954 | 8/1985 |
| JP | 08-007610 | 1/1996 |
| JP | 09-245746 | 9/1997 |
| JP | 11-345598 | 12/1999 |
| JP | 2001-155882 | 6/2001 |
| JP | 2001-202923 | 7/2001 |
| JP | 2001-255589 | 9/2001 |
| JP | 2001-266803 | 9/2001 |

(Continued)

Primary Examiner—Georgia Y Epps
Assistant Examiner—Ryan Howard
(74) Attorney, Agent, or Firm—Harness, Dickey & Pierce, P.L.C.

(57) ABSTRACT

The invention provides an optical source device and a projector including the optical source device, in which a microwave is used to reduce the size, and increase the life span.

The optical source device according to the invention includes a solid high frequency oscillating unit that outputs a high frequency signal, a waveguide that receives the high frequency signal output from the solid high frequency oscillating unit and radiates the received high frequency signal as a microwave, and a light emitting unit that emits light by the microwave radiated from the waveguide unit. A container of the waveguide unit has a space surrounded by reflective surfaces that reflect the microwave radiated from the antenna unit so as to collect the microwave. The projector includes this optical source device, an optical modulating unit that modulates a light beam emitted from the light emitting unit of the optical source device according to image information to form an optical image, and a projecting unit that projects the optical image formed by the optical modulating unit.

7 Claims, 6 Drawing Sheets

FOREIGN PATENT DOCUMENTS

| | | |
|---|---|---|
| JP | 2001-338620 | 12/2001 |
| JP | 2001-351791 | 12/2001 |
| JP | 2002-141026 | 5/2002 |
| JP | 2002-203523 | 7/2002 |
| JP | 2002-280191 | 9/2002 |
| JP | 2003-168398 | 6/2003 |
| JP | 2003-178605 | 6/2003 |
| JP | 2003-249197 | 9/2003 |
| JP | 2004-012309 | 1/2004 |
| JP | 2004-505429 | 2/2004 |
| JP | 2004-079369 | 3/2004 |
| JP | 2004-087360 | 3/2004 |
| JP | 2004-087434 | 3/2004 |
| JP | 2005-051350 | 2/2005 |
| JP | 2005-079088 | 3/2005 |
| JP | 2005-129408 | 5/2005 |
| JP | 2005-174928 | 6/2005 |
| JP | 2006-128075 | 5/2006 |

* cited by examiner

LIGHT SOURCE DEVICE AND PROJECTOR INCLUDING LIGHT SOURCE DEVICE

TECHNICAL FIELD

The present invention relates to an optical source device using a microwave and a projector including the optical source device.

BACKGROUND ART

Heretofore, projectors have been used for presentations at conferences, a home theater, or the like. As light sources that are used in these projectors, an ultrahigh pressure mercury lamp with a pair of electrodes has been used. Since abrasions occur on the electrodes or the lamp is clouded due to deterioration with age as the projector is continuously used, the lamp has a short life span of approximately 2000 hours.

In order to resolve this problem, a method has been disclosed in JP-A-2001-155882 in which a microwave is generated using a magnetron, and a non-electrode light source lamp (corresponding to a non-electrode light emitting tube in this invention) is turned on by the microwave.

Specifically, a microwave radiating optical source device is applied to an image display device. At this time, the microwave radiating optical source device includes a magnetron that generates a microwave, a resonator having a hole that resonates the microwave and exits light, a non-electrode light source lamp that seals a radiating medium that is provided in the resonator and is radiated by the microwave, and a pair of magnetic force generating units that generate magnetic lines of force substantially in a right angle direction with respect to the exit direction of the exit light from the non-electrode light source lamp, and generate magnetic lines of force in directions opposite to each other with the non-electrode light source lamp interposed therebetween. As such, the non-electrode optical source lamp makes the microwave radiating optical source device tolerable for continuous use, therefore, the life span of the microwave radiating optical source device can be increased.

However, a microwave radiating optical source device that is disclosed in JP-A-2001-155882 uses a magnetron, and in this microwave radiating optical source device, the size and weight thereof may be increased. Further, a magnetron oscillating tube that forms the microwave radiating optical source device has one type of a vacuum tube structure where a filament (cathode) and an anode are provided therein. As such, the non-electrode optical source lamp has a long life span, but the magnetron oscillating tube does not have a long life span due to the damage in the filament or the abrasion in the electrode. In addition, when the magnetron oscillating tube is driven, a high voltage of several kV needs to be applied to the anode, which increases the size of a power supply circuit.

The present invention has been made to solve the above-described problems, and it is an object of the present invention to provide an optical source device and a projector including the optical source device in which a microwave is used to reduce a size thereof, and to increase a life span thereof.

DISCLOSURE OF THE INVENTION

An optical source device according to the invention includes a solid high frequency oscillating unit that outputs a high frequency signal, a waveguide unit that receives the high frequency signal output from the solid high frequency oscillating unit and radiates the received high frequency signal as a microwave, and a light emitting unit that emits light by the microwave radiated from the waveguide unit.

In the optical source device, the solid high frequency oscillating unit includes a solid high frequency oscillator that generates the high frequency signal, and an amplifier that amplifies the high frequency signal generated by the solid high frequency oscillator, the waveguide unit includes an antenna unit that radiates the high frequency signal amplified by the amplifier as the microwave, and a container that contains a conductive material, accommodates the antenna unit, and has a space surrounded by reflective surfaces that reflect the microwave radiated from the antenna unit so as to collect the microwave, and the light emitting unit includes a non-electrode light emitting tube that is disposed in a region where the microwave is collected by the container, and has a portion extending to the outside of the container and a light emitting material is sealed therein for emitting light by the microwave, and a reflective unit that reflects a light beam emitted from the non-electrode light emitting tube using the extending portion of the non-electrode light emitting tube as a focal point or an approximate focal point.

The optical source device further includes a safety device that prevents a reflective wave from a target, onto which the microwave is radiated, from returning to the amplifier, and is provided between the amplifier and the antenna unit.

In the optical source device, the solid high frequency oscillator includes a surface acoustic wave oscillator that has a surface acoustic wave resonator.

In the optical source device, the surface acoustic wave resonator includes a first layer that is formed of single crystal diamond or hard carbon having an elastic constant equal or similar to an elastic constant of polycrystalline diamond, a piezoelectric layer that is laminated on the first layer, comb-like electrodes (IDT (Interdigital Transducer) electrodes) that are formed on the piezoelectric layer, and a silicon oxide layer that is laminated on the comb-like electrodes.

In the optical source device, the solid high frequency oscillating unit includes a plurality of the amplifiers that are connected in parallel to the solid high frequency oscillator and receive the high frequency signal generated by the solid high frequency oscillator, and an adder that adds the high frequency signals amplified by the plurality of amplifiers and outputs the added result.

In the optical source device, a member that has a dielectric constant of 1 or more is accommodated in the space of the container.

In the optical source device, the solid high frequency oscillating unit, the waveguide unit, and the light emitting unit are unitized.

In the optical source device, the high frequency signal is a frequency signal in a band of 300 MHz to 30 GHz.

A projector according to the invention includes an optical source device that includes a solid high frequency oscillating unit that outputs a high frequency signal, a waveguide unit that receives the high frequency signal output from the solid high frequency oscillating unit and radiates the received high frequency signal as a microwave, and a light emitting unit that emits light by the microwave radiated from the waveguide unit, an optical modulating unit that modulates a light beam emitted from the optical source device according to image information to form an optical image, and a projecting unit that projects the optical image formed by the optical modulating unit.

BEST MODE FOR CARRYING OUT THE INVENTION

Hereinafter, the preferred embodiments of the invention will be described with reference to the accompanying drawings.

First Embodiment

Figure 1:
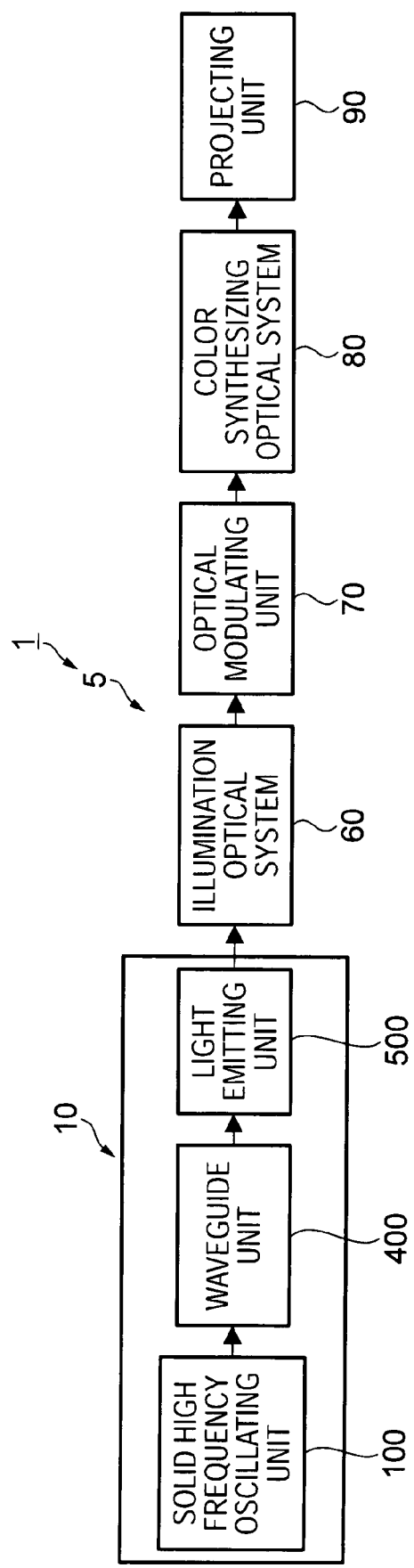
FIG. 1 is a block diagram illustrating a structure of an optical system of a projector in a case where an optical source device according to a first embodiment of the invention is applied to the projector.

FIG. 1 is a block diagram illustrating a structure of an optical system of a projector in a case where an optical source device according to a first embodiment of the invention is applied to the projector. Referring to FIG. 1, a structure and an operation of an optical system 5 of a projector 1 will be schematically described.

As shown in FIG. 1, an optical system 5 of the projector 1 includes an optical source device 10, an illumination optical system 60, an optical modulating unit 70, a color synthesizing optical system 80, and a projecting unit 90. Further, the light source device 10 includes a solid high frequency oscillating unit 100 that outputs a high frequency signal, such as a signal in a UHF band (300 MHz to 3 GHz) or a signal in an SHF band (3 GHz to 30 GHz), a waveguide unit 400 that radiates the high frequency signal input by the solid high frequency oscillating unit 100 as a microwave, and a light emitting unit 500 that emits light by the microwave radiated from the waveguide unit 400. Further, the illumination optical system 60 makes the illumination intensity of the light emitted from the light source device 10 uniform, and separates the light into respective color light components. In addition, the optical modulating unit 70 modulates the respective color light components separated by the illumination optical system 60 according to image information, thereby forming optical images. The color synthesizing optical system 80 synthesizes the optical images of the respective color light components that are separated into the respective colors by the illumination optical system 60 and then modulated by the optical modulating unit 70. The projecting unit 90 projects the optical images that are synthesized by the color synthesizing optical system 80. Further, the optical source device 10 is configured by unitizing the solid high frequency oscillating unit 100, the waveguide unit 400, and the light emitting unit 500. In this case, the unitization means that some functional units are physically integrated with each other or some functional units are functionally collected.

Figure 2:
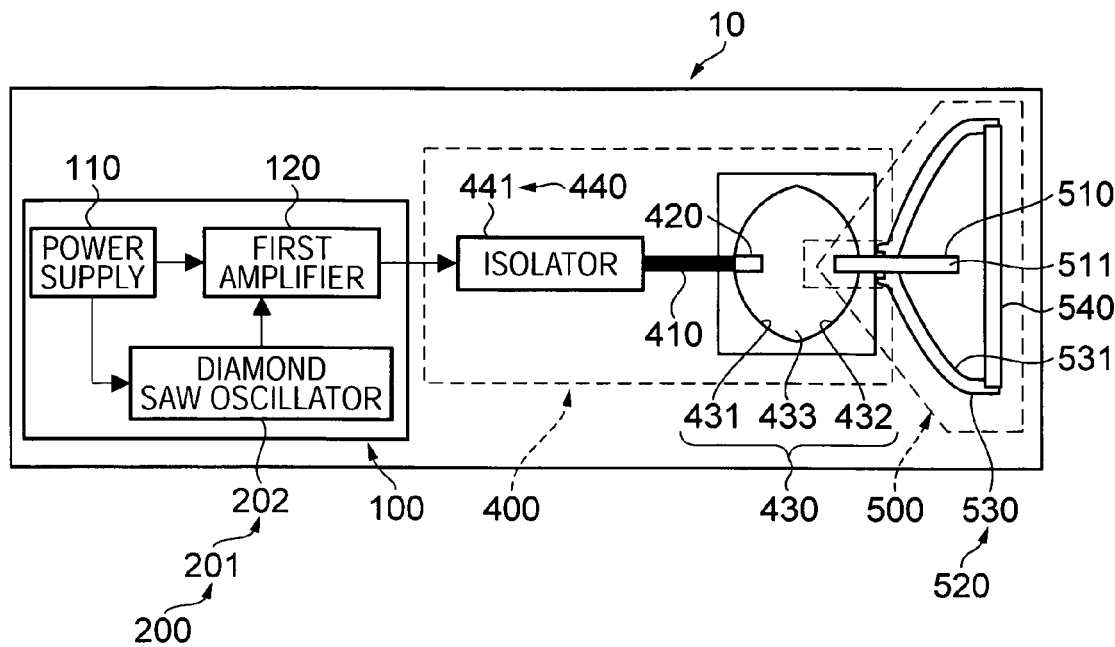
FIG. 2 is a block diagram illustrating schematic structures of a solid high frequency oscillating unit, a waveguide unit, and a light emitting unit of an optical source device.

FIG. 2 is a block diagram illustrating schematic structures of the solid high frequency oscillating unit, the waveguide unit, and the light emitting unit in the optical source device. Referring to FIG. 2, the structure and operation of each of the solid high frequency oscillating unit 100, the waveguide unit 400, and the light emitting unit 500, which form the light source device 10, will be described.

As shown in FIG. 2, the solid high frequency oscillating unit 100 includes a power supply 110, a diamond SAW oscillator 202 that functions as a surface acoustic wave (SAW) oscillator 201 to be a solid high frequency oscillator 200, and a first amplifier 120 that functions as an amplifier. The waveguide unit 400 includes a cable 410, an antenna unit 420 (hereinafter, simply referred to as "antenna"), a container unit 430 (hereinafter, simply referred to as "container"), and an isolator 441 that functions as a safety device 440. The light emitting unit 500 is configured to have a non-electrode light emitting tube 510, a reflector 530 functioning as a reflecting unit 520, and a protective glass 540.

The solid high frequency oscillating unit 100 will now be described in detail. The power supply 110 supplies power to the diamond SAW oscillator 202 and the first amplifier 120, respectively. Further, in this embodiment, the diamond SAW oscillator 202 is used as the surface acoustic wave oscillator 201 that functions as the solid high frequency oscillator 200. In addition, a rear stage of the diamond SAW oscillator 202 is connected to a previous stage of the first amplifier 120. In addition, a high frequency signal that is output by the diamond SAW oscillator 202 is amplified by the first amplifier 120 to be then output. The high frequency signal that is output by the first amplifier 120 becomes a high frequency signal that is output by the high frequency oscillating unit 100. In this embodiment, the solid high frequency oscillating unit 100 outputs a high frequency signal in a band of 2.45 GHz, which is amplified at a high frequency output level that is capable of exciting a light emitting material 511 (to be described below) sealed in the non-electrode light emitting tube 510 so as to make the non-electrode light emitting tube 510 emit light.

Further, the solid high frequency oscillator 200 that forms the solid high frequency oscillating unit 100 is a surface acoustic wave oscillator 201 that uses the surface acoustic wave resonator 300 to be described below. Furthermore, in this embodiment, the diamond SAW oscillator 202 is used as the surface acoustic wave oscillator 201. Accordingly, the diamond SAW resonator 310 is used as a surface acoustic wave resonator 300 to be described below. The solid high frequency oscillator 200 may use a solid high frequency oscillator other than the diamond SAW oscillator. Further, the solid in the solid high frequency oscillator is the representation for an oscillator using a gas, such as a vacuum tube using a magnetron or the like, and means an oscillator using a solid, such as a diamond.

The waveguide unit 400 will be described in detail. The waveguide unit 400 guides a high frequency signal output from the solid high frequency oscillating unit 100, and radiates it as a microwave. Basically, the waveguide unit 400 may include the antenna 420 that radiates a microwave, and the container 430 that accommodates the antenna 420 and the non-electrode light emitting tube 510 to be described below. In this embodiment, the waveguide unit 400 further includes the cable 410 that guides a high frequency signal to the antenna 420, and the isolator 441 for a reflective wave countermeasure. Further, as for the cable 410 and the antenna 420, a coaxial cable may be used such that a cable core of the coaxial cable may be used as the antenna 420.

The isolator 441 is provided between the first amplifier 120 of the solid high frequency oscillating unit 100 and the antenna 420 at the rear stage of the first amplifier 120 of the solid high frequency oscillating unit 100. Therefore, it is possible to prevent that as the result of radiating the microwave from the antenna 420, a reflective wave from the container 430 or the non-electrode light emitting tube 510 becoming a target returns to the solid high frequency oscillating unit 100, thus preventing the first amplifier 120 from causing failure. In this case, the prevention means that the reflective wave is consumed as heat by a resistor provided in the isolator 441, and thus the reflective wave returning to the first amplifier or the like is reduced to a range in which the failure does not occur in the first amplifier 120 or the like due to the reflective wave.

The container 430 is formed of a member that contains a conductive material. The container 430 includes a pair of microwave reflecting surfaces 431 and 432 that reflect the microwave, and an internal space that are surrounded by the pair of microwave reflecting surfaces 431 and 432. In addition, the antenna 420 of the waveguide unit 400 is disposed in such a manner that the antenna 420 protrudes to the inner side of the space 433 by a predetermined distance toward approximately the center of the microwave reflecting surface 431. Further, the non-electrode light emitting tube 510 of the light emitting unit 500 is disposed in such a manner that the non-electrode light emitting tube 510 protrudes to the inner side of the space 433 by a predetermined distance toward approximately the center of the microwave reflecting surface 432. In this case, the microwave reflecting surfaces 431 and 432 are formed such that the microwaves radiated from the antenna 420 are reflected on the microwave reflecting surfaces 431 and 432 and are then collected at the non-electrode light emitting tube 510 that protrudes to the inner side of the space 433. Further, the antenna 420 and the non-electrode light emitting tube 510 are disposed according to the opposite positional relationships.

In the container 430 that has the above-described structure, if the microwaves are radiated from the antenna 420 into the space 433, the radiated microwaves radially expand, are reflected on the microwave reflecting surfaces 431 and 432, and are collected at a protruding portion of the disposed non-electrode light emitting tube 510. In this case, the space 433 is surrounded by the microwave reflecting surfaces 431 and 432, and thus the microwaves radiated from the antenna 420 can be effectively held in the space without leaking the microwaves to the outside. Further, in this embodiment, air is filled into the space 433. Further, the space 433 is completely surrounded by the microwave reflecting surfaces 431 and 432, which prevents the microwaves from leaking outside the space 433.

The light emitting unit 500 will be described in detail. The light emitting unit 500 reflects the light beams emitted from the non-electrode light emitting tube 510, and exits the light beams to the side of the optical modulating unit 70. The non-electrode light emitting tube 510 that forms the light emitting unit 500 is formed to have a tubular shape using a material, such as glass, which transmits light, without a filament or electrode structure. In this embodiment, the non-electrode light emitting tube 510 is made of quartz glass. Further, as the light emitting material 511 that is sealed in the non-electrode light emitting tube 510, for example, rare gases, such as neon, argon, krypton, xenon, and halogen, may be sealed, or a metal, such as mercury or sodium, or a metal compound may be sealed together with the rare gases. In this embodiment, the mercury, the rare gases, and a small amount of halogen are sealed.

Further, the non-electrode light emitting tube 510 has the above-described tubular shape, and is disposed in such a manner that one end thereof protrudes to the inner side of the space 433 of the container 430, and the other end extends to the outside of the container 430. The front end side that becomes the extending portion protrudes to the side of the inner surface of the reflector 530 functioning as the reflective portion 520 to be disposed in the reflector 530.

In addition, the portion of the non-electrode light emitting tube 510 that is disposed to protrude to the inner side of the space 433 of the container 430 corresponds to a region where the microwaves are collected, and by the collected microwaves, the light emitting material 511 that is sealed in the non-electrode light emitting tube 510 excites and emits light. As a result, an entire inner region of the non-electrode light emitting tube 510 emits light, and thus the portion of the non-electrode light emitting tube 510 that protrudes to the inner surface side of the reflector 530 also emits light.

The reflector 530 is formed of quartz glass and has an inner surface that is formed in a paraboloidal shape. In the paraboloidal shape, the front end side of the non-electrode light emitting tube 510 that is disposed to protrude to the inner surface side of the reflector 530 is formed to become a focal point or substantially a focal point. It is preferable that the front end side of the non-electrode light emitting tube 510 become a focal point. However, the front end side of the non-electrode light emitting tube 510 may substantially become a focal point. Further, at the inner surface side of the reflector 530, a dielectric film for improving the reflectance of visible light is coated and a reflective surface 531 is formed. As a result, the light beams that are emitted from the non-electrode light emitting tube 510 protruding to the inner surface side of the reflector 530 radially expand, are reflected on the reflective surface 531, become approximate collimating light beams, and exit to the side of the optical modulating unit 70.

Further, the shape of the reflector 530 at the inner surface side maybe an elliptical surface shape. In this case, the reflector 530 may have a structure in which a collimating concave lens is disposed to convert the light beams reflected on the elliptical surface into the approximate collimating light beams.

The protective glass 540 is disposed on the front end side of the reflector 530, and serves to prevent dusts from permeating into the light emitting unit 500 in the case where the light source device 10 is detached from the projector 1, and serves to prevent broken pieces from flying in the case where the light emitting unit 500 is broken due to dropping.

Further, the light source device 10 has a light source device casing 11 (shown in FIG. 7), and accommodates the solid high frequency oscillating unit 100, the waveguide unit 400, and the light emitting unit 500 to unitize them.

Through the above-described structure and operation, the light source device 10 emits the light beams, and exits the light beams to the side of the optical modulating unit 70.

Figure 3:
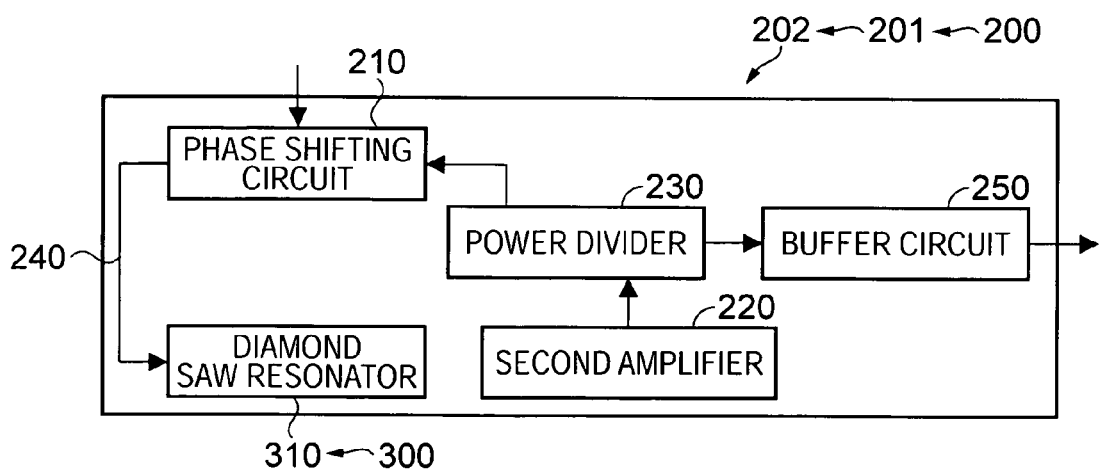
FIG. 3 is a block diagram illustrating a schematic structure of a solid high frequency oscillator that forms a solid high frequency oscillating unit.

FIG. 3 is a block diagram illustrating a schematic structure of a solid high frequency oscillator that forms the solid high frequency oscillating unit. Referring to FIG. 3, the structure and operation of the solid high frequency oscillator 200 will be described.

The solid high frequency oscillator 200 (in this embodiment, the diamond SAW oscillator 202 functioning as the surface acoustic wave oscillator 201) has a structure in which a closed loop circuit 240 is formed using a phase shifting circuit 210, a diamond SAW resonator 310 that functions as the surface acoustic wave resonator 300, a second amplifier 220, and a power divider 230, and a buffer circuit 250 is connected to one output side of the power divider 230. The phase shifting circuit 210 is inputted with a control voltage from the power supply 110 and changes a phase of the loop circuit 240. These blocks are connected to one another such that they are matched with predetermined characteristic impedance of, for example, 50 ohm. Further, the diamond SAW resonator 310 is connected to the input side of the second amplifier 220 such that an input voltage at which the second amplifier 220 enters a saturation state is supplied to the diamond SAW resonator 310.

Therefore, it is possible to directly oscillate a high frequency signal in a band of GHz using the diamond SAW resonator 310. Further, in a state where the matching is maintained, output power of the second amplifier 220 can be output to the outside from the power divider 230 through the buffer circuit 250. Further, when using this circuit structure, power that is applied to the diamond SAW resonator 310 can be minimized, which interrupts a continuous oscillating state. Further, using the phase shifting circuit 210, frequency modulation can be performed on the high frequency signal, and with respect to the non-electrode light emitting tube 510, a microwave frequency can be changed or adjusted. In this embodiment, the diamond SAW resonator 310 outputs a high frequency signal in a band of 2.45 GHz. However, the phase shifting circuit 210 may not be used. In this case, the solid high frequency oscillator 200 becomes a fixed oscillator that oscillates with a frequency determined by the characteristic of the diamond SAW resonator 310.

Figure 4:
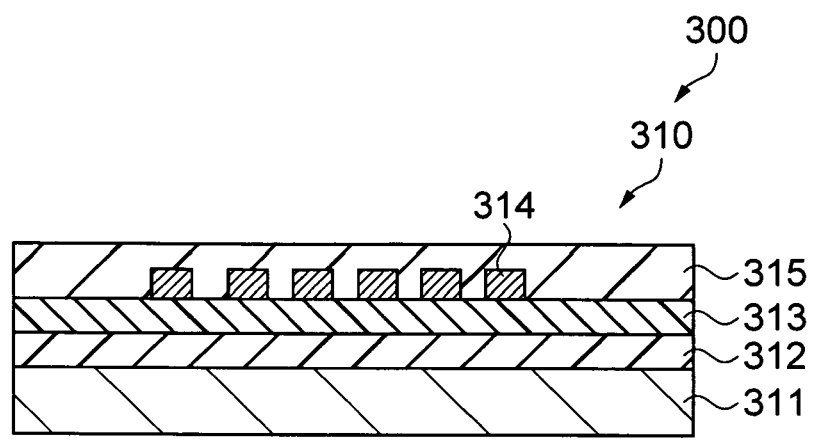
FIG. 4 is a cross-sectional view illustrating a schematic structure of a surface acoustic wave resonator.

FIG. 4 is a cross-sectional view illustrating a schematic structure of a surface acoustic wave resonator. Referring to FIG. 4, the structure of the surface acoustic wave resonator 300 and the method of manufacturing the same will be described.

As shown in FIG. 4, in this embodiment, the diamond SAW resonator 310 is used as the surface acoustic wave resonator 300. In addition, while a silicon substrate 311 is used as a base, a single crystal diamond layer 312 is laminated on the silicon substrate 311. Then, a piezoelectric layer 313 (in this embodiment, a thin film made of zinc oxide (ZnO)) is laminated on the single crystal diamond layer 312. Then, on the piezoelectric layer 313, IDT electrodes 314 that excite the surface acoustic wave are provided, and reflecting electrodes (not shown) that reflect the surface acoustic wave are provided. Further, the IDT electrode 314 includes a pair of comb-like electrodes that are disposed so as to be engaged with each other. Then, a silicon oxide layer 315 is laminated on the IDT electrodes 314 and the reflecting electrodes. Since the temperature dependency of an operational frequency in the silicon oxide layer 315 shows an opposite characteristic to that in each of the piezoelectric layer 313, the IDT electrodes 314, and the single crystal diamond layer 312, the silicon oxide layer 315 is laminated to improve the temperature dependency of the operational frequency.

Further, the single crystal diamond layer 312 is formed by using a vapor synthesizing method. In addition, it is possible to use a hard carbon layer that has elastic constant equal or similar to that of polycrystalline diamond, instead of the single crystal diamond layer 312. Further, the piezoelectric layer 313 may be formed by sputtering method or a vapor synthesizing method using AlN, Pb(Zr, Ti) O2 other than ZnO. The single crystal diamond layer 312 is preferably used in order to improve an oscillation characteristic of the solid high frequency oscillator 200. However, as described above, the hard carbon layer may be used.

As described above, the diamond SAW resonator 310 that functions as the surface acoustic wave resonator 300 has a laminated structure, is manufactured by using a minute processing technology used at the time of manufacturing a semiconductor, and is constructed in a chip. Further, the surface acoustic wave resonator 300 to be constructed in a chip or other elements are mounted, and thus the solid high frequency oscillating unit 100 that has the solid high frequency oscillator 200 is formed and manufactured. Accordingly, the solid high frequency oscillator 100 has a small size.

Figure 5:
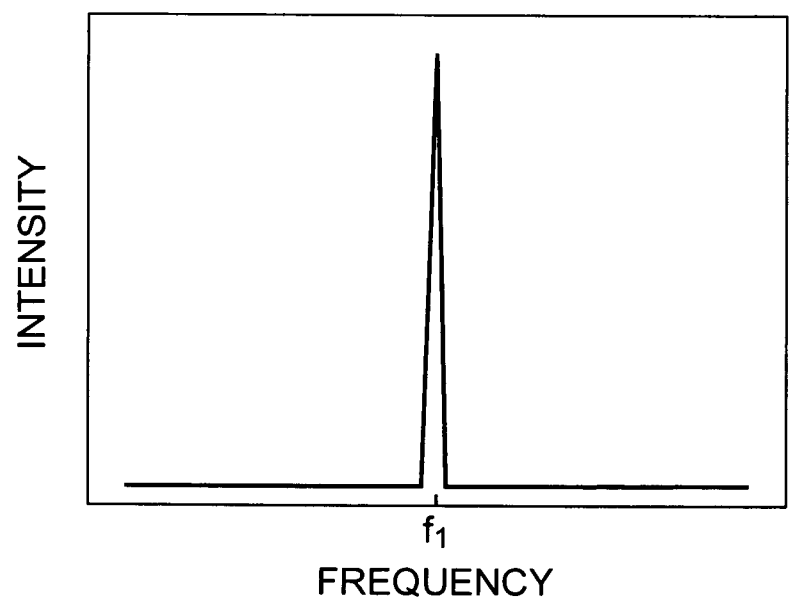
FIG. 5 is a schematic diagram illustrating relationships between a frequency and the intensity of a signal that is output from a diamond SAW oscillator.

FIG. 5 is a schematic diagram illustrating the relationship between a frequency and the intensity of a signal that is output from the diamond SAW oscillator. In FIG. 5, a horizontal axis indicates the frequency of the signal, and a longitudinal axis indicates the intensity of the signal.

By using the structure of the above-described diamond SAW resonator 310, as shown in FIG. 5, among the signals that are output from the diamond SAW oscillator 202, only a high frequency signal (band of GHz) at a specific frequency f1 is output. Further, the fast direct oscillation can be performed. In this embodiment, the specific frequency f1 outputs a high frequency signal at a band of 2.45 GHz.

Figure 6:
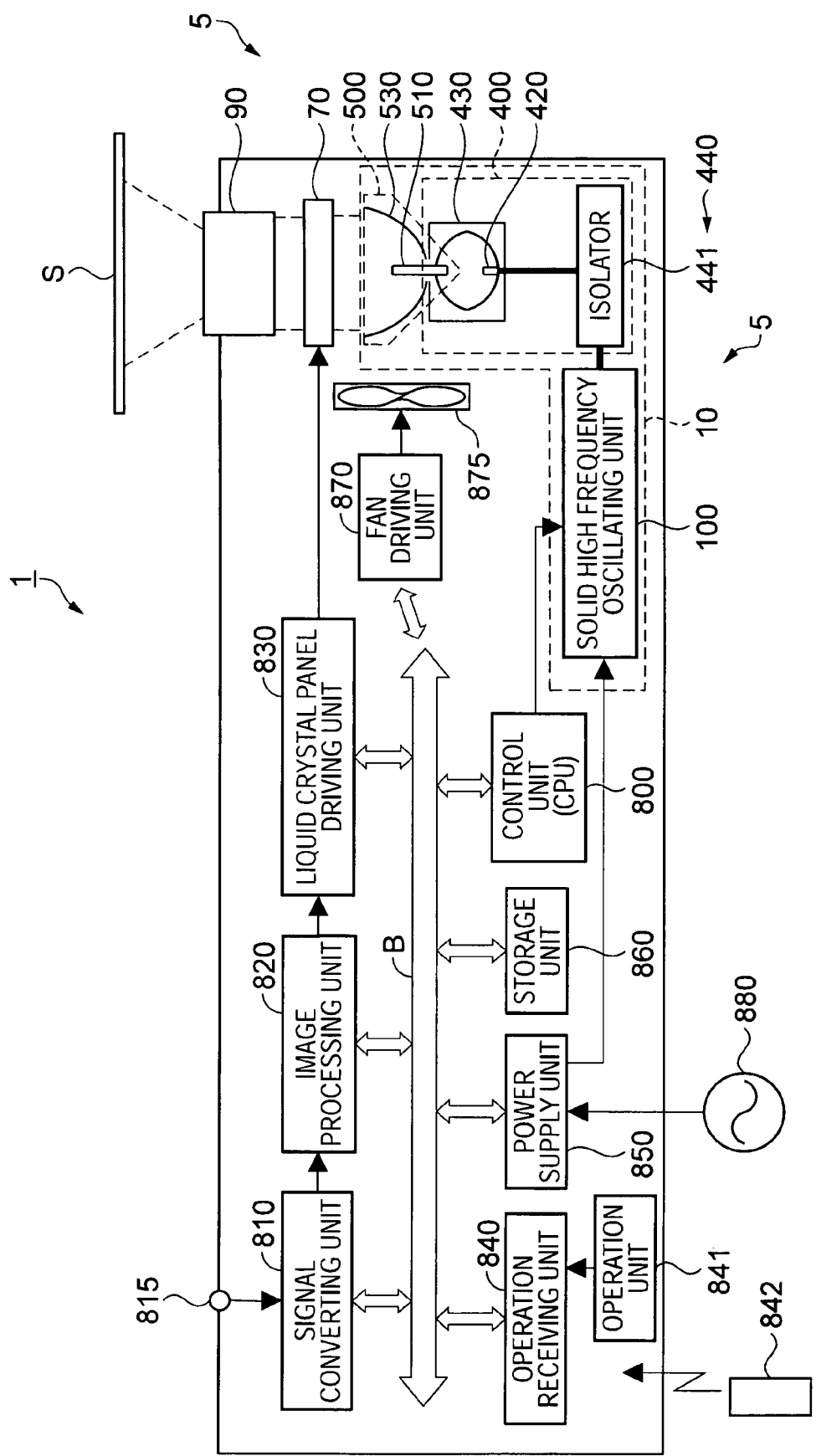
FIG. 6 is a circuit block diagram of a projector.

FIG. 6 is a circuit block diagram of a projector. The circuit structure and the operation of the projector 1 will be described with reference to FIG. 6.

The projector 1 includes a control unit 800, a signal converting unit 810, an image processing unit 820, a liquid crystal panel driving unit 830, an operation receiving unit 840, a power supply unit 850, a storage unit 860, and a buffer driving unit 870. Further, the respective components are connected to one another by a bus line B. In addition, an optical system 5 includes a light source device 10 (including a solid high frequency oscillating unit 100, a waveguide unit 400, and a light emitting unit 500), an optical modulating unit 70, a projecting unit 90, and the like.

Next, the operation of the respective components will be described.

The signal converting unit 810 is connected to an image input terminal 815 that is disposed on an external surface of a main body of the projector 1. In addition, the signal converting unit 810 receives analog image signals that are supplied by an external image signal supply device (not shown) that is connected to the image input terminal 815. As the analog image signals, image signals, for example, RGB signals that indicate computer images output by a personal computer, composite image signals that indicate moving pictures output from a video recorder or a television receiver, and the like, are supplied to the image input terminal 815. In addition, the signal converting unit 810 performs AD conversion on an analog image signal that is input by the image input terminal 815, and outputs the converted digital image signal to the image processing unit 820.

In order to convert the input digital image signal into a signal suitable for being displayed by the liquid crystal panel 71 (see FIG. 7) that forms the optical modulating unit 70 to be described below, the image processing unit 820 performs image processes, such as writing image data in an image memory (not shown) and reading the image data according to predetermined conditions, converts the image data into an analog image signal again, and outputs the analog image signal to the liquid crystal panel driving unit 830 as the image signal. Further, the image processes include a scaling process for expanding or contracting the image displayed by the image signal and matching the resolution of the image with the resolution of the liquid crystal panel 71 (see FIG. 7), a γ correcting process for converting a grays-scale value of the image signal into a gray-scale value suitable for the image to be displayed by the liquid crystal panel 71, and the like. The image processes, such as the scaling process and the γ correcting process, which are performed by the image processing unit 820, are performed by executing firmware defining an image process sequence that is stored in the storage unit 860.

The liquid crystal panel driving unit 830 supplies the image signal output from the image processing unit 820, the driving voltage based on the image signal and the like to the liquid crystal panel 71, and drives the liquid crystal panel 71.

The control unit 800 is a CPU (Central Processing Unit), and performs signal exchange with the respective components through the bus line B and controls the whole operation of the projector 1.

The storage unit 860 stores a starting program that indicates the process sequence and the process contents of when starting the projector 1, various control programs that instruct and control the operation of the projector 1, software, firmware, and accompanied data.

When a user operates the operation unit 841 disposed on the external surface of the main body of the projector 1 or the remote controller 842, the operation receiving unit 840 receives the operation input, and outputs operation signals becoming triggers of various operations to the control unit 800.

A fan driving unit 870 drives (rotates) fans 875 using a driving circuit (not shown) according to a fan driving command from the control unit 800. Further, the plurality of fans 875 are disposed in the projector 1. When the fan 875 rotates, it absorbs the outside air from the outside of the projector 1 to cause the airflow. The fan 875 radiates the heat generated by the light emitting unit 500, the optical modulating unit 70, the power supply unit 850, and the like, and exhausts the heated air to the outside of the projector 1 so as to cool down the projector 1.

The power supply unit 850 guides alternating current power supplied by the external power supply 880 from a plug, performs various process, such as a voltage transforming process, a rectifying process, and a smoothing process, by using an incorporated AC/DC converting unit (not shown), and supplies a stabilized direct current voltage to the respective components of the projector 1.

In accordance with a control command from the control unit 800, the solid high frequency oscillating unit 100 of the light source device 10 makes the light emitting unit 500 emit light (turned on) or makes the light emitting unit 500 not emit light (turned off).

Figure 7:
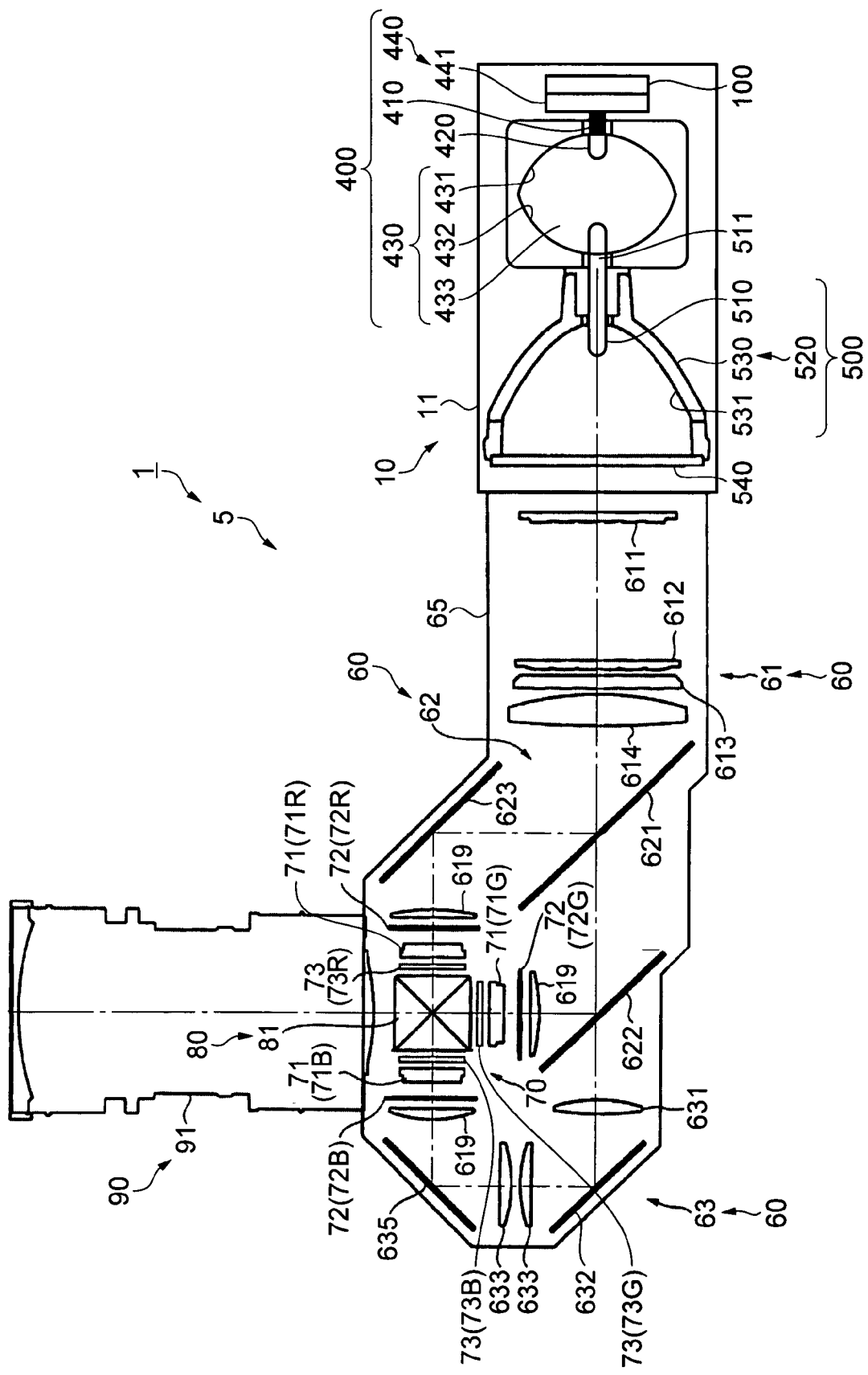
FIG. 7 is a diagram specifically illustrating components of an optical system of a projector.

FIG. 7 is a diagram specifically illustrating the respective components of the optical system of the projector shown in FIG. 1. Referring to FIG. 7, the structure and operation of the optical system 5 of the projector 1 will be described.

As shown in FIG. 1, the optical system 5 includes the optical source device 10, the illumination optical system 60, the optical modulating unit 70, the color synthesizing optical system 80, and the projecting unit 90. In addition, the optical beams emitted from the optical source device 10 are modulated by the optical modulating unit 70 according to the image information, thereby forming optical images. The formed optical images are projected onto the screen S (shown in FIG. 6) by the projecting unit 90. Further, the structure and the operation of when in the light source device 10, the solid high frequency oscillating unit 100 and the waveguide unit 400 are driven, and thus the microwave excites a light emitting material 511 sealed in the non-electrode light emitting tube 510 of the light emitting unit 500 so as to emit light have been described with reference to FIG. 2. Therefore, the structure and the operation of the optical system 5 other than the above-described structure and operation will be described.

As shown in FIG. 7, the optical system 5 includes, in addition to the optical source device 10, an integrator illumination optical system 61, a color separating optical system 62, and a relay optical system 63 that form an illumination optical system 60, an optical modulating unit 70, a color synthesizing optical system 80, and a projection lens 91 that forms the projecting unit 90. The respective components that form the illumination optical system 60, the optical modulating unit 70, and the color synthesizing optical system 80 are accommodated in an optical component casing 65, and are integrated with a unit. The illumination optical system 60 that forms the optical system 5 in this embodiment may be approximately changed or removed by the used optical system.

The integrator illumination optical system 61 that forms the illumination optical system 60 is an optical system that uniforms the illumination intensity of the light beam emitted from the optical source device 10 in the plane orthogonal to the illumination optical axis (shown by a one-dot chain line). The integrator illumination optical system 61 includes an optical source device 10, a first lens array 611, a second lens array 612, a polarized light converting element 613, and a superimposing lens 614.

The first lens array 611 has a structure in which small lenses, each having an approximately rectangular outline when viewed from an illumination optical axis direction, are disposed in a matrix. Each of the small lenses divides the light beam emitted from the optical source device 10 into partial light beams, and exits the partial light beams in the illumination optical axis direction.

The second lens array 612 has substantially the same structure as the first lens array 611, that is, a structure in which small lenses are disposed in a matrix. The second lens array 612 has a function of forming images of the respective small lenses of the first lens array 611 on the liquid crystal panel 71 to be described below, together with the superimposing lens 614.

The polarized light converting element 613 serves to convert the light emitted from the second lens array 612 into one type of polarized light, which improves the utilization efficiency of the light in the optical modulating unit 70. Specifically, each partial light beam, which is converted into one type of polarized light by the polarized light converting element 613, substantially overlaps the liquid crystal panel 71 (to be described below) of the optical modulating unit 70 by means of the superimposing lens 614. In the projector that uses the liquid crystal panel 71 of the type that modulates the polarized light, since only one type of the polarized light can be used, it is not possible to use half the light beams from the non-electrode light emitting tube 510 that emits the random polarized light. For this reason, by using the polarized light converting element 613, the light beam emitted from the non-electrode light emitting tube 510 is converted into one type of polarized light, which improves the utilization efficiency of the light in the optical modulating unit 70.

The color separating optical system 62 includes two dichroic mirrors 621 and 622, and a reflective mirror 623. The plurality of partial light beams that are emitted from the integrator illumination optical system 61 are separated into color light components of three primary colors including red (R), green (G), and blue (B) by the two dichroic mirrors 621 and 622.

The relay optical system 63 includes an incident-side lens 631, a pair of relay lenses 633, and reflective mirrors 632 and 635. In this embodiment, the relay optical system 63 has a function of guiding a blue light component as one of the color light components separated by the color separating optical system 62 to the liquid crystal panel 71B for blue light (to be described below) of the optical modulating unit 70.

At this time, among the light components that are emitted from the integrator illumination optical system 61, the green light component and the blue light component transmit the dichroic mirror 621 of the color separating optical system 62, and the red light component is reflected on the dichroic mirror 621 of the color separating optical system 62. The red light component that is reflected by the dichroic mirror 621 is reflected on the reflective mirror 623, passes through the field lens 619, and reaches the liquid crystal panel 71R for red light. The field lens 619 converts each partial light beam emitted from the second lens array 612 into a light beam parallel to a central axis of each partial light beam (main light beam). This is applicable to the filed lenses 619 that are respectively provided at the light-incident sides of the liquid crystal panels 71B and 71G for blue light and green light.

Between the blue light and the green light that have passed through the dichroic mirror 621, the green light is reflected by the dichroic mirror 622, passes through the field lens 619, and reaches the liquid crystal panel 71G for green light. Meanwhile, the blue light transmits the dichroic mirror 622, passes through the relay optical system 63, passes through the field lens 619, and reaches the liquid crystal panel 71B for blue light. The reason why the relay optical system 63 is used for blue light is as follows. Since the length of the optical path of the blue light is larger than that of the other color light, the relay optical system 63 is used to prevent the utilization efficiency of the light from being lowered due to the radiation of the light. That is, this is to transmit the partial light beam incident on the incident-side lens 631 to the field lens 619. The relay optical system 63 is configured to transmit the blue light component among the three color light components. The invention is not limited thereto, but the relay optical system 63 may be configured to transmit the red light component among the three color light components.

The optical modulating unit 70 modulates the incident light beam according to the image information so as to form a color image. The optical modulating unit 70 includes three incident polarizing plates 72 (a red light incident polarizing plate 72R for red light, a green light incident polarizing plate 72G for green light, and a blue light incident polarizing plate 72B for blue light) onto which the color light components separated by the color separating optical system 62 are incident. Further, the optical modulating unit 70 includes three liquid crystal panels 71 (a red light liquid crystal panel 71R for red light, a green light liquid crystal panel 71G for green light, and a blue light liquid crystal panel 71B for blue light) as optical modulating devices that are on disposed at rear stages of the respective incident polarizing plate 72. Furthermore, the optical modulating unit 70 includes three emission polarizing plates 73 (a red light emission polarizing plate 73R for red light, a green light emission polarizing plate 73G for green light, and a blue light emission polarizing plate 73B for blue light) that are disposed at rear stages of the respective liquid crystal panels 71.

The color synthesizing optical system 80 includes one cross dichroic prism 81.

The liquid crystal panels 71 (71R, 71G, and 71B) use a polysilicon TFT (thin film transistor) as a switching element, and in each of them, liquid crystal is sealed airtight in a pair of transparent substrates that are disposed opposite to each other. In addition, the liquid crystal panel 71 modulates the light beam incident through the incident polarizing plate 72 according to image information and emits the modulated light beam.

Among the respective color light beams that are separated by the color separating optical system 62, the incident polarizing plate 72 transmits only the polarized light in a predetermined direction, and absorbs the other light beams, and has a structure in which a polarizing film is attached to a substrate made of sapphire glass. Further, the emission polarizing plate 73 has substantially the same structure as the incident polarizing plate 72. Among the respective light beams that are emitted form the liquid crystal panel 71, the emission polarizing plate 73 transmits only the polarized light in a predetermined direction, and absorbs the other light beams, and has a structure in which the polarizing axis of the transmitted polarized light is set to be orthogonal to the polarizing axis of the polarized light transmitted by the incident polarizing plate 72.

The cross dichroic prism 81 synthesizes the optical images that are emitted from the emission polarizing plate 73 and are modulated for every color light, and forms color images. In the cross dichroic prism 81, a dielectric multilayered film that reflects red light and a dielectric multilayered film that reflects the blue light are provided in substantially an X shape along the interface of four right angle prisms, and three color light components are synthesized by the dielectric multilayered film. The color light that is synthesized by the cross dichroic prism 81 is emitted in an extending direction of the projection lens 91 that forms the projecting unit 90. In addition, the image light that is emitted from the cross dichroic prism 81 is projected on the screen S by the projection lens 91.

Further, the liquid crystal panels 71 (71R, 71G, and 71B), the emission polarizing plates 73 (73R, 73G, and 73G), and the cross dichroic prism 81 are integrated with one another in one unit.

According to the first embodiment, the following effects can be obtained.

(1) According to the optical source device 10 of this embodiment, the optical source device 10 has a filament or vacuum tube structure by the solid high frequency oscillator 100, the waveguide portion 400, and the light emitting unit 500, does not use a magnetron oscillating tube having a large size, and radiates the microwave so as to make the light emitting unit 500 (non-electrode light emitting tube 510) emit light. In addition, in the optical source device 10, the optical modulating unit 70 modulates the light beam emitted from the light emitting unit 500 according to the image information so as to form an optical image, and the formed optical image is projected by the projecting unit 90. As a result, the size of the solid high frequency oscillating unit 100 can be reduced, the life span of the solid high frequency oscillating unit 100 can be increased, and the life span of the light emitting unit 500 can be increased. Therefore, it is possible to achieve a reduction in size and an increase in the life span of the projector 1 using the optical source device 10.

(2) According to the optical source device 10 of this embodiment, the antenna 420 radiates the microwave in the space 433 of the container 430 that includes a conductive material, thereby suppressing leakage of the microwave. Therefore, it is possible to provide an optical source device 10 that is capable of suppressing an adverse effect on wireless communication apparatuses, such as Bluetooth (registered trademark), zigbee (registered trademark), Home RF, and WLAN, which are used in an ISM band, or medical apparatuses. Further, the projector 1 that uses the optical source device 10 can suppress an adverse effect on wireless communication apparatuses, such as Bluetooth (registered trademark), zigbee (registered trademark), Home RF, and WLAN, which are used in an ISM band, or medical apparatuses.

(3) According to the optical source device 10 of this embodiment, the isolator 441 that functions as the safety device 440 is disposed between the first amplifier 120 of the solid high frequency oscillating unit 100 and the antenna 420 at the rear stage of the first amplifier 120 of the solid high frequency oscillating unit 100. Consequently, it is possible to prevent that as the result of radiating the microwave from the antenna 420, a reflective wave from the container 430 or the non-electrode light emitting tube 510 becoming a target returns to the solid high frequency oscillating unit 100, thereby preventing the first amplifier 120 from causing failure. Accordingly, in the projector 1 that uses the optical source device 10, the safety can be improved.

(4) According to the optical source device 10 of this embodiment, the solid high frequency oscillator 200 that forms the solid high frequency oscillating unit 100 includes the surface acoustic wave oscillator 120 that has the surface acoustic wave resonator 300. For this reason, fast direct oscillation can be made in operational frequencies in GHz bands, the low phase noise characteristics can be obtained, and an oscillation signal of a basic frequency at a high performance can be obtained with high precision. Therefore, the optical source device 10 stably maintains an output frequency of the microwave, and stably emits light in the non-electrode light emitting tube 510. Accordingly, the projector 1 that uses the optical source device 10 can project the images in a state where it maintains stable luminance.

(5) According to the optical source device 10 of this embodiment, the surface acoustic wave resonator 300 has a laminated structure that includes the single crystal diamond layer 312 (or piezoelectric layer laminated on a hard carbon layer that has an elastic integer that is equal to or similar to that of the polycrystalline diamond), the piezoelectric layer 313, the IDT electrode 314, and the silicon oxide layer 315. As a result, the transmission speed of the surface acoustic wave can be increased, and the oscillation can be made up to the very high frequencies. In addition, as compared with the other substrate materials, the electrode width of the surface acoustic wave resonator 300 can be increased, which improves the power resistance characteristic. In addition, it is possible to suppress the variation in frequency of the surface acoustic wave oscillator 201 due to the variation in temperature, and it is possible to stabilize the microwave output. As a result, it is possible to make the optical emitting material 511 stably emit light in the non-electrode light emitting tube 510. Accordingly, the projector 1 that uses the optical source device 10 can project the images in a state where it maintains stable luminance.

(6) According to the optical source device 10 of this embodiment, since the solid high frequency oscillator 100, the waveguide unit 400, and the light emitting unit 500 form a unit as the optical source device 10, they can be easily handled. Further, in the projector 1 that uses the optical source device 10, the optical source device 10 can be easily installed in the projector 1 and can be easily removed from the projector 1.

(7) According to the optical source device 10 of this embodiment, since the surface acoustic wave resonator 300 has a laminated structure and is manufactured by a minute processing technology used at the time of manufacturing a semiconductor, the size and weight of the surface acoustic waver resonator 300 can be reduced. As a result, the solid high frequency oscillator 100 that uses the surface acoustic wave resonator 300 can be smaller in size and weight. Accordingly, it is possible to reduce the size and weight of the projector 1 that uses the optical source device 10.

(8) According to the optical source device 10 of this embodiment, the diamond SAW resonator 310 that functions as the surface acoustic wave resonator 300 has a laminated structure, and is manufactured by a minute processing technology used at the time of manufacturing the semiconductor. As a result, the variation in resonance frequency does not exist among the respective resonators. Further, the diamond SAW resonator 310 that functions as the surface acoustic wave resonator 300 excites the surface acoustic wave in the substrate right before inputting the signal from the phase shifting circuit 210, and outputs the high frequency signal according to the frequency of the surface acoustic wave (in this embodiment, band of 2.45 GHz). Accordingly, since it is possible to output the high frequency signal from the solid high frequency oscillating unit 100 including the surface acoustic wave resonator 300 right after power is supplied, the microwave can be immediately radiated from the antenna 420 of the waveguide unit 400, and it is possible to immediately make the non-electrode light emitting tube 510 of the light emitting unit 500 emit light. Accordingly, if the power is supplied, the projector 1 that uses the optical source device 10 can immediately make the non-electrode light emitting tube 510 of the light emitting unit 500 emit light, and can immediately project the optical image formed by the optical modulating unit 70. When a radiating lamp according to the related art is used, such as a high pressure mercury lamp, even when the power is supplied to the projector, in terms of the characteristics of the radiating lamp, the radiating lamp gradually emits light, and the luminance is gradually increased. For this reason, it takes several minutes for the luminance to reach the predetermined luminance. However, in the projector 1 that uses the microwave according to the invention, if the power is supplied to the projector 1, it is possible to immediately emit light with the predetermined luminance. Therefore, the projector 1 can be used without preparation time, and thus it is possible to improve convenience in the projector 1.

(9) In the case of the projector that uses the radiating lamp, such as a high pressure mercury lamp according to the related art, a ballast serving as a power supply is necessary in order to make the radiating lamp emit light. In order to supply power of about 300 W, the capacity (volume) that is substantially equal to that of the power supply unit 850 of the projector 1 is required, which becomes a bottleneck of a small-sized projector. Meanwhile, according to the projector 1 that uses the optical source device 10 of the invention, the radiating lamp can emit light only by the solid high frequency oscillating unit 100. Therefore, since the ballast is unnecessary, the size of the projector 1 can be reduced.

Second Embodiment

Figure 8:
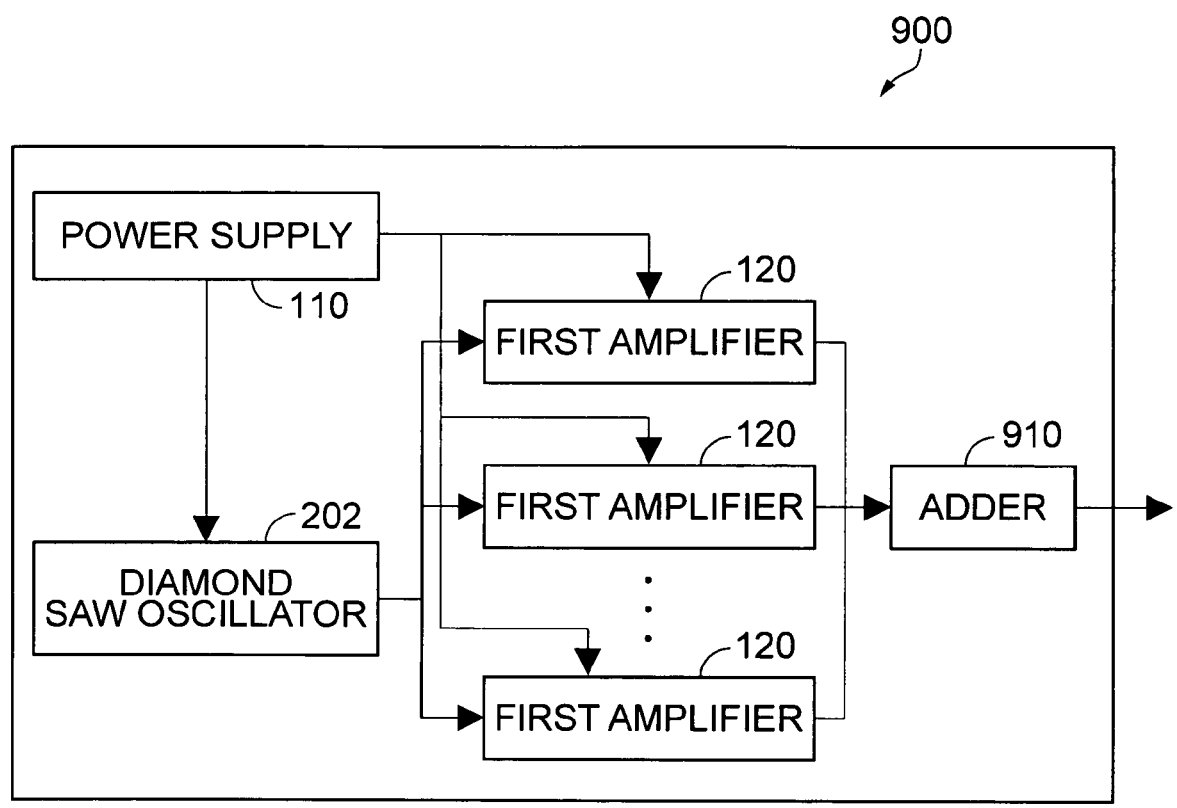
FIG. 8 is a block diagram illustrating another structure of a solid high frequency oscillating unit of an optical source device according to a second embodiment of the invention.

FIG. 8 is a block diagram illustrating another structure of a solid high frequency oscillating unit of an optical source device according to a second embodiment of the invention. Referring to FIG. 8, a structure and an operation of a solid high frequency oscillating unit 900 will be described. Further, the same components as the first embodiment are denoted by the same reference numerals.

As shown in FIG. 8, the solid high frequency oscillating unit 900 according to the second embodiment is different from the solid high frequency oscillating unit 100 according to the first embodiment in that a plurality of first amplifiers 120 and an adder 910 are used.

The solid high frequency oscillating unit 900 includes a diamond SAW oscillator 202 that functions as the solid high frequency oscillator 200, the plurality of first amplifiers 120, the adder 910, and a power supply 110. The power supply 110 supplies power to the diamond SAW oscillator 202 and each of the plurality of first amplifiers 120. Further, the plurality of first amplifiers 120 are connected in parallel to one another between the diamond SAW oscillator 202 and the adder 910. In addition, a high frequency signal that is output from the diamond SAW oscillator 202 is input to each of the first amplifiers 120. Each of the first amplifiers 120 amplifiers the high frequency signal that is input from the diamond SAW oscillator 202, and outputs the amplified result to the adder 910. The adder 910 adds the high frequency signals input from the respective first amplifiers 120, and outputs the added high frequency signal. The high frequency signal that is output from the adder 910 becomes the high frequency signal that is output from the solid high frequency oscillating unit 900.

According to the second embodiment, in addition to the effects according to the first embodiment, the following effects can be obtained.

(1) According to the solid high frequency oscillating unit 900 of this embodiment, the respective first amplifiers 120 amplify the high frequency signals input from the diamond SAW oscillator 202, and the adder 910 synthesizes the amplified high frequency signals, which achieve high output of a high frequency signal. If the solid high frequency oscillating unit 900 is used in the projector 1, it is possible to radiate a microwave of high output, as compared with the solid high frequency oscillating unit 100. The non-electrode light emitting tube 510 of the light emitting unit 500 can emit light with the large luminance. Accordingly, the optical source device 10 is used in the projector 1, which provides the projector 1 that can project an optical image with the high luminance.

However, the invention is not limited thereto, and various changes or improvement can be made. Modifications are described below.

(First Modification)

The reflective surface 531 of the reflector 530 of the light emitting unit 500 in the above-described embodiment has a paraboloidal shape, and reflects the light beam emitted from the non-electrode light emitting tube 510 to become substantially a collimating light beam. This is because the structure of the optical system 5 of the projector 1 other than the light emitting unit 500 uses a lens array integrator type. Meanwhile, when it uses a rod integrator type, the shape of the reflective surface of the reflector 530 can be appropriately changed such that the reflected light beam is concentrated and is incident on the rod.

(Second Modification)

The projector 1 in the above-described embodiment uses the liquid crystal panel 71 as the optical modulating device. However, the invention is not limited thereto, and the optical modulating device may modulate the incident light according to the image information, and a micromirror-type optical modulating device may be used. For example, a DMD (Digital Micromirror Device) may be used as the micromirror-type optical modulating device. Further, when the micromirror-type optical modulating device is used, an incident polarizing plate or an emission polarizing plate may be unnecessary, and a polarized light converting element may be unnecessary.

(Third Modification)

The optical source device 10 in the above-described embodiment is used in a transmissive liquid crystal type of a projector 1. However, the invention is not limited thereto. That is, even when the optical source device 10 is used in a projector that adopts an LCOS (Liquid Crystal On Silicon) type that is a reflective liquid crystal type, the same effects as the above can be achieved.

(Fourth Modification)

The optical modulating unit 70 in the above-described embodiment uses a three-plate type that uses three liquid crystal panels 71. However, the invention is not limited thereto, but it may be possible to use a single plate type that uses one liquid crystal panel. Further, when a single plate type is used, the color synthesizing optical system 80 or the color separating optical system 62 of the illumination optical system 60 may be unnecessary.

(Fifth Modification)

The optical source device 10 in the above-described embodiment is applied to a front type of a projector 1 that projects an optical image onto the screen S disposed to the outside. However, the invention is not limited thereto. The optical source device 10 may be applied to a rear type of a projector that has a screen provided in the projector and projects an optical image onto the screen.

(Sixth Modification)

Air is filled into the space 433 that is formed in the container 430 of the waveguide unit 400 in the above-described embodiment. However, a member that is made of, for example, a high molecule material with dielectric constant of 1 or more may be accommodated in the space 433. When this structure is used, as compared with the case of using the air, the length of the antenna can be reduced, which reduces a size of the container 430. Accordingly, the size of the optical source device 10 can be further reduced, which further reduces the size of the projector 1.

(Seventh Modification)

A voltage adjusting unit may be provided in the projector 1 in the above-described embodiment so as to vary the first amplifier 120 of the solid high frequency oscillating unit 100. When this structure is used, the output power of the microwave can be varied, which varies the luminance of the light beam emitted from the non-electrode light emitting tube 510. Accordingly, an amplified degree is adjusted to be matched with a scene of a projected image (for example, bright scene or dark scene), and thus the luminance of the image light projected from the projector 1 can be adjusted to be matched with the image scene.

(Eighth Modification)

The waveguide unit 400 in the above-described embodiment has the isolator 441 that functions as the safety device 440. However, when the waveguide 400 is not affected by the reflective wave, the isolator 441 may not be used. Further, when the solid high frequency oscillating unit 100 is affected by the noise or the like, the components of the safety device 440 may be appropriately changed or added.

(Ninth Modification)

The optical source device 10 in the above-described embodiment outputs a high frequency signal in a band of 2.45 GHz by the solid high frequency oscillating unit 100, and the high frequency signal is radiated from the antenna 420 of the waveguide unit 400 as the microwave. However, the invention is not limited thereto. On the assumption that the microwave does not leak from the container 430, the structure of the surface acoustic wave resonator 300 is appropriately changed, and the high frequency signal of each color is output and is radiated as the microwave, which makes the non-electrode light emitting tube 510 emit light. In this way, it is possible to radiate a microwave according to a type or light emitting state (light emitting color state) of a light emitting material 511 that is sealed in the non-electrode light emitting tube 510.

(Tenth Modification)

The optical source device 10 in the above-described embodiment is used as the optical source of the projector 1. However, the invention is not limited thereto. The optical source device that is small-sized and light may be applied to other optical apparatuses. Further, the optical source device 10 may be appropriately applied to illumination apparatuses for airplanes, ships, vehicles, and the like, and interior illumination apparatuses.

As described above, the optical source device of the invention has a filament or vacuum tube structure using the solid high frequency oscillating unit and the waveguide unit, but does not use a magnetron oscillating tube having a large size, and radiates the microwave to make the light emitting unit emit light. Therefore, the reduction in the size and the increase in the life span of the solid high frequency oscillating unit, and the increase of the life span in the light emitting unit can be achieved.

The invention claimed is:

1. An optical source device comprising:
   a solid high frequency oscillating unit that outputs a high frequency signal;
   a waveguide unit that receives the high frequency signal output from the solid high frequency oscillating unit and radiates the received high frequency signal as a microwave; and
   a light emitting unit that emits light by the microwave radiated from the waveguide unit,
   wherein the solid high frequency oscillating unit includes a solid high frequency oscillator that generates the high frequency signal, and an amplifier that amplifies the high frequency signal generated by the solid high frequency oscillator,
   the waveguide unit includes an antenna unit that radiates the high frequency signal amplified by the amplifier as the microwave, and a container that contains a dielectric material, accommodates the antenna unit, and has a space surrounded by reflective surfaces that reflect the microwave radiated from the antenna unit so as to collect the microwave, and
   the light emitting unit includes a non-electrode light emitting tube that is disposed in a region where the microwave is collected by the container, and has a portion extending to the outside of the container and a light emitting material is sealed therein for emitting light by the microwave, and a reflective unit that reflects a light beam emitted from the non-electrode light emitting tube using the extending portion of the non-electrode light emitting tube as a focal point or an approximate focal point.

2. The optical source device according to claim 1, further comprising:
   a safety device that prevents a reflective wave from a target, onto which the microwave is radiated, from returning to the amplifier, and is provided between the amplifier and the antenna unit.

3. The optical source device according to claim 1,
   wherein the solid high frequency oscillator includes a surface acoustic wave oscillator that has a surface acoustic wave resonator.

4. The optical source device according to claim 3,
   wherein the surface acoustic wave resonator includes:
   a first layer that is formed of single crystal diamond or hard carbon having an elastic constant equal or similar to an elastic constant of polycrystalline diamond;
   a piezoelectric layer that is laminated on the first layer;
   comb-like electrodes that are formed on the piezoelectric layer; and
   a silicon oxide layer that is laminated on the comb-like electrodes.

5. The optical source device according to claim 1,
   wherein the solid high frequency oscillating unit includes:
   a plurality of amplifiers that are connected in parallel to the solid high frequency oscillator and receive the high frequency signal generated by the solid high frequency oscillator, wherein the plurality of amplifiers includes the amplifier; and
   an adder that adds the high frequency signals amplified by the plurality of amplifiers and outputs the added result.

6. The optical source device according to claim 1,
   wherein the solid high frequency oscillating unit, the waveguide unit, and the light emitting unit are unitized.

7. The optical source device according to claim 1,
   wherein the high frequency signal is a frequency signal in a band of 300 MHz to 30 GHz.

\* \* \* \* \*